(12) United States Patent
Iwama et al.

(10) Patent No.: US 10,489,149 B2
(45) Date of Patent: Nov. 26, 2019

(54) INFORMATION PROCESSING APPARATUS, INFORMATION PROCESSING METHOD AND PROGRAM

(71) Applicant: International Business Machines Corporation, Armonk, NY (US)

(72) Inventors: Futoshi Iwama, Kanagawa-ken (JP); Takaaki Tateishi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 14/217,619

(22) Filed: Mar. 18, 2014

(65) Prior Publication Data

US 2014/0289178 A1    Sep. 25, 2014

(30) Foreign Application Priority Data

Mar. 22, 2013    (JP) .................................. 2013-060183

(51) Int. Cl.
   *G06N 3/12*    (2006.01)
   *G06F 8/72*    (2018.01)

(52) U.S. Cl.
   CPC ........................................................................
       *G06F 8/72* (2013.01); *G06N 3/12* (2013.01)

(58) Field of Classification Search
   None
   See application file for complete search history.

(56) References Cited

U.S. PATENT DOCUMENTS

2011/0138362 A1    6/2011 Chiu et al.

FOREIGN PATENT DOCUMENTS

| JP | 3418544 B | 6/2003 |
|----|-----------|--------|
| JP | 2005070887 A | 3/2005 |
| JP | 2007041804 A | 2/2007 |
| JP | 4001286 B | 10/2007 |
| JP | 2008519365 A | 6/2008 |

(Continued)

OTHER PUBLICATIONS

Eggermont, Data Mining using Genetic Programming: Classification and Symbolic Regression, Doctoral Thesis, University of Leiden, 2005, pp. 1-174.*

(Continued)

*Primary Examiner* — Wilbert L Starks
(74) *Attorney, Agent, or Firm* — Peter Edwards

(57) ABSTRACT

A method for acquiring an input value such that an output value differs before and after refactoring is not known and an information processing apparatus searching for such an input value that inequivalent output values can be brought about for the equivalent input values among multiple target programs. The apparatus including: an acquisition section acquiring, for each of the multiple target programs, an input/output constraint showing a condition to be satisfied by an input value and an output value; a constraint condition generating section generating a constraint condition which becomes true when the multiple input/output constraints for the multiple target programs are satisfied, input values for the multiple target programs are equivalent, and output values for the multiple target programs are not equivalent; and a constraint releasing section giving the constraint condition to a constraint solver to obtain an input value satisfying the constraint condition.

14 Claims, 9 Drawing Sheets

(56) References Cited

FOREIGN PATENT DOCUMENTS

JP         2011198034 A    10/2011
WO      2005071609 A1   8/2005

OTHER PUBLICATIONS

Singer, et al., Complexity Analysis of Nelder-Mead Search Iterations, Proceedings of the Conference on Applied Mathematics and Computation, Dubrovnik, Croatia, Sep. 13-18, 1999, pp. 185-196.*
Wagner, et al., Online Convergence Detection for Evolutionary Multi-Objective Algorithms Revisited, IEEE Congress on Evolutionary Computation, Barcelona, Spain, 2010, pp. 1-8.*
Ficici, Solution Concepts in Coevolutionary Algorithms, Doctoral Thesis, Brandeis University, 2004, pp. 1-299 (Year: 2004).*
Unknown, "Code refactoring", Wikipedia, the free encyclopedia. Oct. 17, 2016. Last accessed Oct. 31, 2016. 6 pages. https://en.wikipedia.org/w/index.php?title=Code_refactoring&oldid=744764566.

\* cited by examiner

```
PROGRAM A, INPUT I={zip, country}, OUTPUT O={addr}
static public Address makeAddr(int zip, int country) {
  if (zip < 0) {
    zip = 1;
  }
  if (country < 0) {
    country = 0;
  }
  Address addr = new Address(zip. country);
  return addr;
}
```

(a)

⇓ REFACTORING OF PROGRAM

```
PROGRAM A', INPUT I={zip', country'}, OUTPUT O={addr'}
static public Address makeAddr(int zip, int country) {
  {
  zip = Match.max(zip, 0);
  country = Math.max(country, 0);
  Address addr = new Address(zip, country);
  return addr;
}
```

PROGRAM A

```
PROGRAM A, INPUT I={zip, country}, OUTPUT O={addr}
static public Address makeAddr(int zip, int country) {
  if (zip < 0) {
    zip = 1;
  }
  if (country < 0) {
    country = 0;
  }
  Address addr = new Address(zip. country);
  return addr;
}
```
(c)

INPUT/OUTPUT CONSTRAINT FOR PROGRAM A

(d)
```
(zip<0 AND zip1=1 AND
  country<0 AND country1=0 AND
  addr={zip=zip1, country=country1}) OR
(zip>=0 AND zip1=zip AND
  country>=0 AND country1=country AND
  addr={zip=zip1, country=country1}) OR
(zip<0 AND zip1=1 AND
  country>=0 AND country1=country AND
  addr={zip=zip1, country=country1}) OR
(zip>=0 AND zip1=zip AND
  country<0 AND country1=0 AND
  addr={zip=zip1, country=country1})
```

FIG. 4

PROGRAM A'

```
PROGRAM A', INPUT I={zip', country'}, OUTPUT O={addr'}
static public Address makeAddr(int zip', int country') {
{
   zip' = Match.max(zip', 0);
   country' = Math.max(country', 0);
   Address addr = new Address(zip', country');
   return addr;
}
```
(e)

INPUT/OUTPUT CONSTRAINT FOR PROGRAM A'

(f)
```
zip1'=max(zip',0) AND
country 1'=max(country'.0) AND
addr'={zip=zip1', country=country1'}
```

FIG. 5

PROGRAM X

```
PROGRAM X, INPUT I={zip, country}, OUTPUT O={addr}
static public Address makeAddr(int zip, int country) {
  if (zip > 0) {
    zip = Math.pow(zip, 2);
  }
  country = 1;
  Address addr = new Address(zip. country);
    return addr;
}
```
(k)

INPUT/OUTPUT CONSTRAINT FOR PROGRAM X (l)
(zip>0 AND (zip1>0) AND country1=1 AND addr={zip=zip1, country=country1}) OR
(zip<=0 AND zip1=zip AND country1=1 AND addr={zip=zip1, country=country1})

FIG. 7

INFORMATION PROCESSING APPARATUS, INFORMATION PROCESSING METHOD AND PROGRAM

CROSS-REFERENCE TO RELATED APPLICATIONS

This application claims priority under 35 U.S.C. § 119 from Japanese Patent Application No. 2013060183 filed Mar. 22, 2013, the entire contents of which are incorporated herein by reference.

BACKGROUND OF THE INVENTION

Field of the Invention

The present invention relates to an information processing apparatus, an information processing method and a program.

Description of Related Art

In program development, refactoring for changing a source code without changing the functions of a program has been performed for the purpose of improving maintainability and the like. A method for verifying whether the equivalence of an output value for an input value of a program is kept before and after refactoring is known.

According to JP2007-41804A, however, it is necessary to acquire a true input value and a false input value for a conditional expression of a program and further compare output values of the program for the input values to perform verification. Therefore, it is difficult to quickly and efficiently detect that there exists an input value whose corresponding output value differs before and after refactoring.

SUMMARY OF THE INVENTION

In a first aspect of the present invention, there are provided an information processing apparatus searching for such an input value that inequivalent output values can be brought about for the equivalent input values among multiple target programs, the apparatus including: an acquisition section acquiring, for each of the multiple target programs, an input/output constraint showing a condition to be satisfied by an input value and an output value; a constraint condition generating section generating a constraint condition which becomes true when the multiple input/output constraints for the multiple target programs are satisfied, input values for the multiple target programs are equivalent, and output values for the multiple target programs are not equivalent; and a constraint releasing section giving the constraint condition to a constraint solver to obtain an input value satisfying the constraint condition; an information processing method using the information processing apparatus; and a program used for the information processing apparatus.

The above Summary of Invention does not enumerate all necessary features of the present invention. A sub-combination of the features can be also an invention.

BRIEF DESCRIPTION OF THE DRAWINGS

FIG. 3 shows an example of refactoring of a target program in the present embodiment;

FIG. 4 shows an example of an input/output constraint for a target program A in the present embodiment;

FIG. 5 shows an example of an input/output constraint for a target program A' in the present embodiment;

FIG. 7 shows an example of an input/output constraint for a target program X in a variation of the present embodiment;

DETAILED DESCRIPTION OF THE PREFERRED EMBODIMENTS

The present invention will be described below through an embodiment of the invention. The embodiment below, however, does not limit the invention according to Scope of Claims. Furthermore, all combinations of features described in the embodiment are not necessarily indispensable for solution means of the invention.

Figure 1:
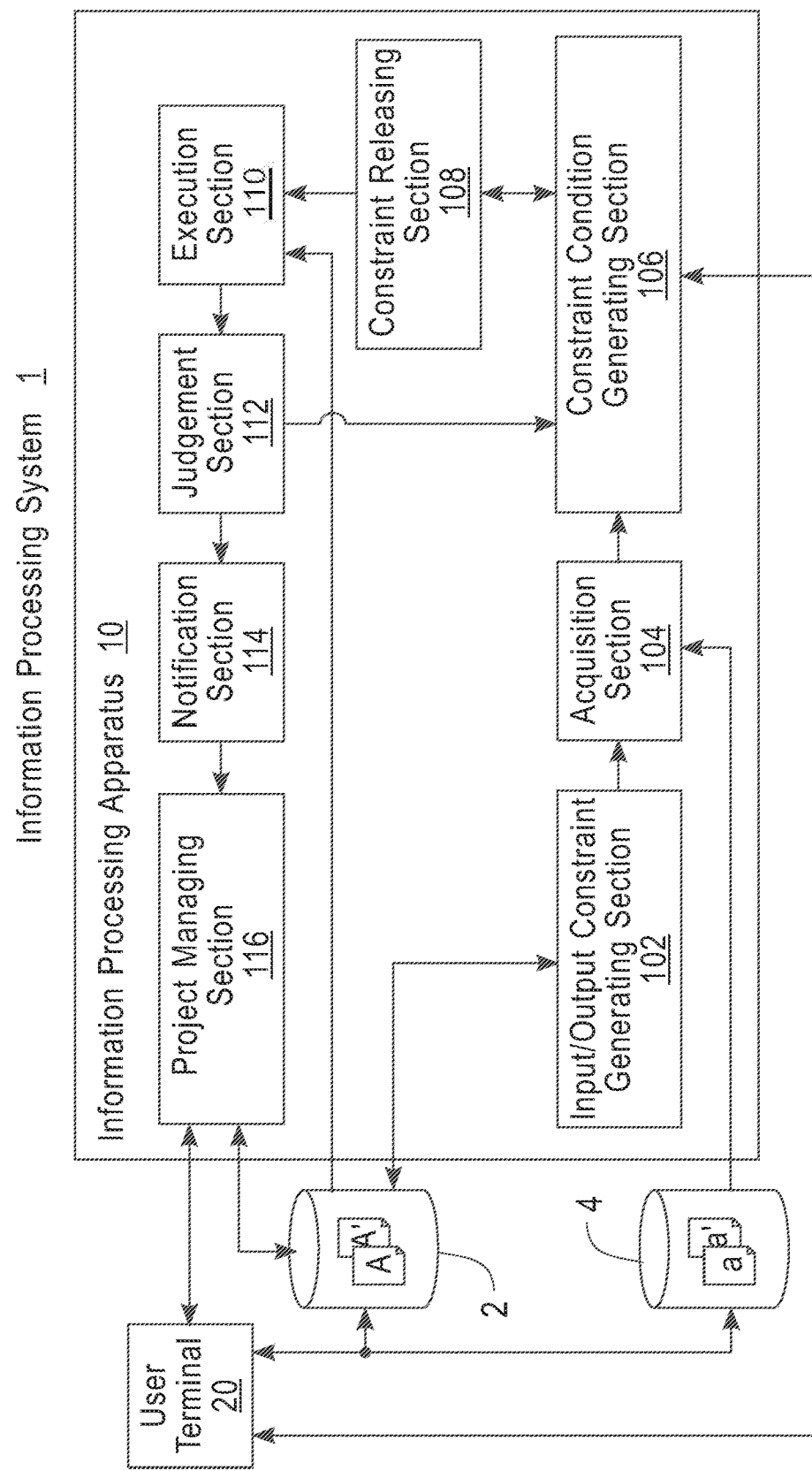
FIG. 1 shows a configuration of an information processing system 1 of the present embodiment.

FIG. 1 shows a configuration of an information processing system 1 of the present embodiment. The information processing system 1 receives target programs before and after refactoring from an external program database 2, acquires equivalent input values which bring about a result of causing the target programs before and after refactoring to output inequivalent output values, and notifies a user terminal 20 of the acquired input values. The information processing system 1 is provided with the program database 2, a constraint database 4, an information processing apparatus 10 and the user terminal 20.

The program database 2 is a database storing multiple target programs. The program database 2 stores, for example, a target program A and a target program A' obtained by performing refactoring of the target program A. The target program A or the like may be a whole program or may be a part of the program such as a function. The program database 2 stores the multiple target programs A and A' (and further a program A") edited by the user terminal 20 and provides the multiple target programs A, A' and the like to the information processing apparatus 10 and the user terminal 20, in response to an instruction from a user.

The constraint database 4 is a database storing an input/output constraint showing a condition to be satisfied by an input value and an output value, for each of the multiple (two or more) target programs. For example, the constraint database 4 stores an input/output constraint a corresponding to the target program A stored in the program database 2 and an input/output constraint a' corresponding to the target program A'. The constraint database 4 receives the input/output constraints for the multiple target programs A and A' edited with the use of the user terminal 20 in response to an instruction from the user terminal 20 and provides the input/output constraints to the information processing apparatus 10.

The information processing apparatus 10 searches for such an input value that inequivalent output values can be brought about for the equivalent input values between the multiple target programs A and A' stored in the program database 2, judges equivalence of output values for the retrieved input value and notifies the user of an input value by which inequivalent output values are obtained. The information processing apparatus 10 is provided with an input/output constraint generating section 102, an acquisition section 104, a constraint condition generating section 106, a constraint releasing section 108, an execution section 110, a judgment section 112, a notification section 114 and a project managing section 116.

The input/output constraint generating section 102 acquires the multiple target programs A and A' from the program database 2 and generates an input/output constraint for each of the acquired target programs A and A'. For example, the input/output constraint generating section 102 acquires the target program A and the target program A' obtained by performing refactoring of the target program A from the program database 2 and generates an input/output constraint for the target program A and an input/output constraint for the target program A'. The input/output constraint generating section 102 provides the generated multiple input/output constraints for the multiple target programs A and A' to the acquisition section 104. The input/output constraint generating section 102 may store the generated multiple input/output constraints in the constraint database 4.

The acquisition section 104 acquires the input/output constraints. For example, the acquisition section 104 may acquire the multiple input/output constraints for the multiple target programs A and A' generated by the input/output constraint generating section 102. Instead, the acquisition section 104 may acquire the multiple input/output constraints for the multiple target programs A and A' from the constraint database 4. The acquisition section 104 provides the acquired input/output constraints to the constraint condition generating section 106.

The constraint condition generating section 106 generates such a constraint condition that becomes true when the multiple input/output constraints for the multiple target programs A and A' (and further the program A") are satisfied, input values for the multiple target programs A and A' are equivalent, and output values for the multiple target programs A and A' are not equivalent. The constraint condition generating section 106 provides the generated constraint condition to the constraint releasing section 108.

The constraint releasing section 108 gives the constraint condition to a constraint solver to obtain an input value satisfying the constraint condition. For example, the constraint releasing section 108 acquires an input value i of an input variable I for the target program A and an input value i' of an input variable I' for the target program A' (or further an input value i" of an input variable I" for the program A") which satisfy the constraint condition acquired from the constraint condition generating section 106.

The constraint releasing section 108 may acquire one input value corresponding to one input variable or a set of input values corresponding to a set of multiple input variables as the input value i. The constraint releasing section 108 provides the acquired input values i, i' and the like to the execution section 110.

The execution section 110 inputs the input values i and i' obtained by the constraint releasing section 108 to the multiple target programs A and A' read from the program database 2 and executes the multiple target programs A and A'. For example, the execution section 110 inputs the input value i to the target program A and executes the target program A; and inputs the input value i' to the target program A' and executes the target program A'.

The execution section 110 provides output values o and o' (and further an output value o") obtained by executing the target programs A and A' (and further the program A") to the judgment section 112. Here, the execution section 110 may acquire one output value corresponding to one output variable or a set of output values corresponding to a set of multiple output variables as the output values o and o'.

The judgment section 112 judges whether or not inequivalent output values o and o' have been obtained from the multiple target programs as a result of the execution by the execution section 110. That is, the judgment section 112 judges whether the output value o from the target program A and the output value o' from the target program A' (and further an output value o") are equal or not. The judgment section 112 provides a result of the judgment to the constraint condition generating section 106 and the notification section 114.

On condition that the judgment section 112 has judged that inequivalent output values o and o' (and further an output value o") have been obtained from the multiple target programs A and A' (and further the program A"), the notification section 114 provides the input values i and i' (and further an input value i") obtained by the constraint releasing section 108, to the project managing section 116. Thereby, the notification section 114 notifies the user of the input values i, i' and the like via the project managing section 116.

The project managing section 116 manages a project related to design and development of a program to be stored in the program database 2, using a project management program. For example, the project managing section 116 may manage allotment of tasks (for example, a task for designing the whole or a part of the program, and the like) included in the project to the user and scheduling of the tasks.

Furthermore, the project managing section 116 communicates with the user terminal 20 to notify the user terminal 20 of the input values i and i' obtained by the constraint releasing section 108. As the project management program, the project managing section 116 may use, for example, IBM Rational Engineering Lifecycle Manager (RELM).

The user terminal 20 receives task information and the input values i and i' from the project managing section 116 of the information processing apparatus 10 and displays them to the user. The user terminal 20 receives an input from the user and provides it to the information processing apparatus 10. The user terminal 20 may be a personal computer, a mobile information terminal or the like.

The user terminal 20 may read out the target programs A and A' from the program database 2 and display them to the user to let the user to edit the programs A and A'. The user terminal 20 may receive the input/output constraints a and a' for the target programs A and A' from the user and store the input/output constraints into the constraint database 4 in association with the target programs A and A'.

As described above, by the information processing apparatus 10 of the present embodiment, it is possible to quickly and efficiently obtain such equivalent input values i and i' that inequivalent output values o and o' are outputted for target programs A and A' before and after refactoring using the constraint releasing section 108.

Thereby, by the information processing apparatus 10, it is possible to notify the user of input values i and i' having a possibility of making it impossible to keep consistency between execution results of target programs A and A' before and after refactoring to call the user's attention.

Figure 2:
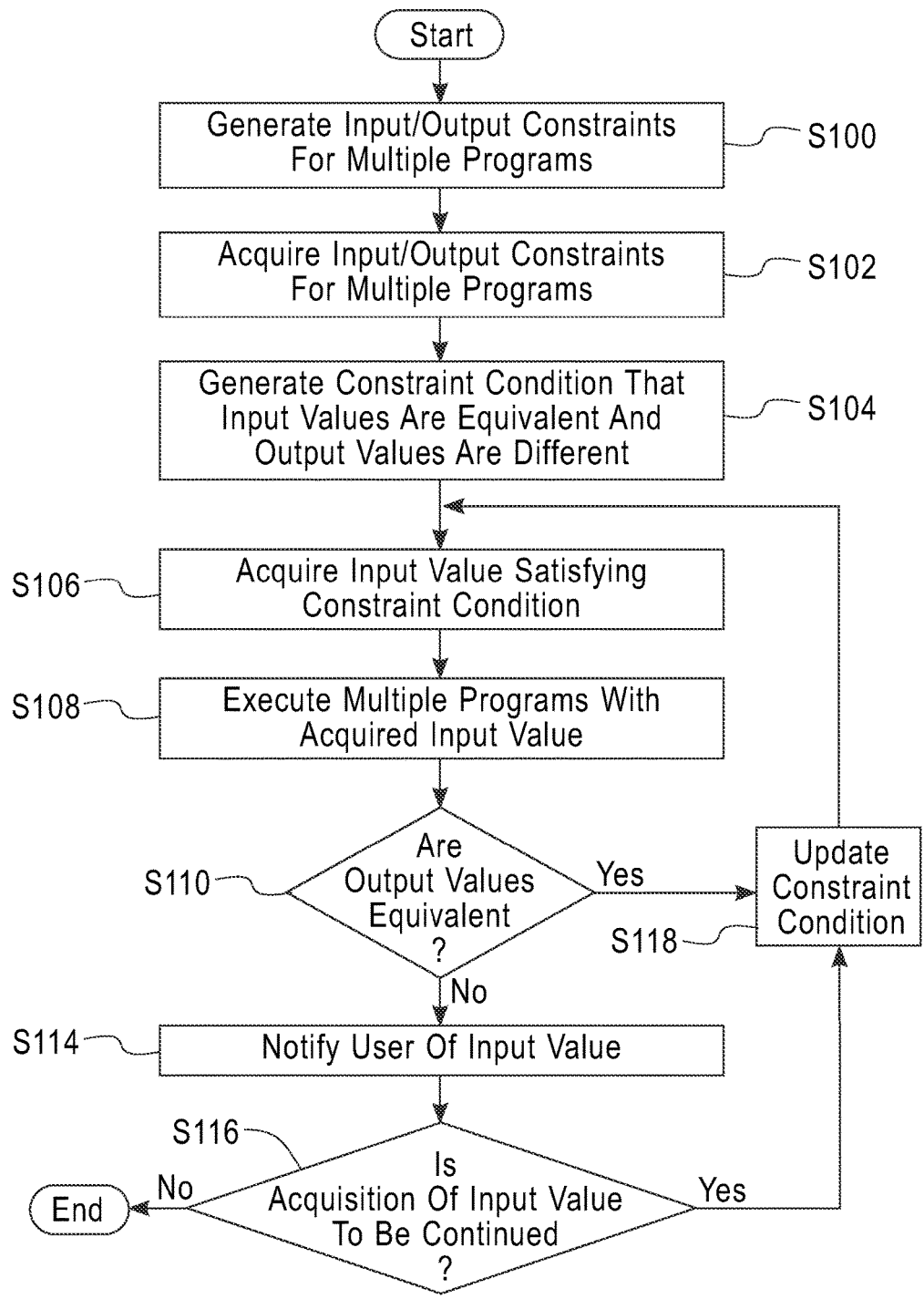
FIG. 2 shows a process flow of an information processing apparatus 10 of the present embodiment.

FIG. 2 shows a process flow of an information processing method by the information processing apparatus 10 of the present embodiment. In the present embodiment, the information processing apparatus 10 executes processes from S100 to S118.

First, at S100, the input/output constraint generating section 102 generates input/output constraints for multiple target programs (as an example, two target programs A and A') by a technique such as Symbolic Execution and Path Conditions. For example, the input/output constraint generating section 102 acquires the target program A from the program database 2, generates, for each of execution paths generated by conditional branches in the target program A, a logical product of a condition for passing through the execution path and a condition for an assignment expression in the execution path to be true, and generates a logical sum of the generated logical products for all the execution paths as an input/output constraint C(I,O).

The input/output constraint generating section 102 similarly generates an input/output constraint C'(I',O') for the target program A' obtained by performing refactoring of the target program A.

Here, the input/output constraint generating section 102 may generate the input/output constraints with the whole of each of the programs before and after refactoring as each of the target programs A and A'. Instead, the input/output constraint generating section 102 may divide each of the programs before and after refactoring into multiple modules such as functions and generate input/output constraints with divided parts which are in a correspondence relationship with each other as the target programs A and A'.

Furthermore, the input/output constraint generating section 102 may generate the input/output constraints from the target programs A and A' which are written in the same language. Instead, the input/output constraint generating section 102 may generate the input/output constraints from the target programs A and A' which are written in different languages. The input/output constraint generating section 102 provides the generated input/output constraints C(I,O) and C'(I',O') to the acquisition section 104.

Next, at S102, the acquisition section 104 acquires the input/output constraints C(I,O) and C'(I',O') from the input/output constraint generating section 102. The acquisition section 104 provides the acquired input/output constraints C(I,O) and C'(I',O') to the constraint condition generating section 106.

Next, at S104, the constraint condition generating section 106 generates such a constraint condition that becomes true when the multiple input/output constraints C(I,O) and C'(I', O') for the multiple target programs A and A' are satisfied, input values i and i' for the multiple target programs A and A' are equivalent, and output values o and o' for the multiple target programs A and A' are inequivalent.

For example, first, the constraint condition generating section 106 acquires the input/output constraint C(I,O) for the target program A and the input/output constraint C'(I',O') for the target program A' from the acquisition section 104.

Next, the constraint condition generating section 106 generates a condition I=I' which becomes true when values of the same input variables I and I' of the multiple target program A and A' are equal, as a condition that the input values i and i' for the multiple target programs A and A' are equivalent.

Instead, the constraint condition generating section 106 may acquire correspondence between the input values i and i' of the multiple target programs A and A' and generate a condition which becomes true when the input value i of the input variable I and the input value i' of the input variable I' for the multiple target programs A and A', respectively, are corresponding values (for example, in the case where the input variable I and the input variable I' are different only in their names and are substantially the same, and the input value i and the input value i' are the same or in the case where the input variable I and the input variable I' are in a correspondence relationship with each other and the input value i and the input value i' are corresponding values), as a condition that the input values i and i' for the multiple target programs A and A' are equivalent.

The case where the input variable I and the input variable I' are in a correspondence relationship with each other may be, for example, a case where a set of input variables I and a set of input variables I' are in a correspondence relationship with each other. As an example, there may be a case where a variable X in the target program A corresponds to multiple variables Y and Z for digits, respectively, in the target program A'.

In such a case, input variable I={X} is defined in the target program A, and input variable I'={Y, Z} is defined in the target program A'. For example, the constraint condition generating section 106 may generate X=Y×10+Z as a condition that the input variable I and the input variable I' are equivalent, when X=Y×10+Z (X is a two-digit integer, and Y and Z are one-digit integers) is satisfied.

As another example, there may be a case where the variable X in the target program A is obtained by calculating the variable Y in the target program A'. For example, when input variable I={X} and input variable I'={Y} are defined, and X=Y+1 (X is an integer equal to or more than 0, and Y is an integer equal to or more than 1) is satisfied, the constraint condition generating section 106 may generate X=Y+1 as a condition that the input variable I and the input variable I' are equivalent.

Next, the constraint condition generating section 106 generates a condition ¬O=O' which becomes true when values of the same output variables O and O' of the multiple target programs A and A' do not agree with each other (here, "¬" indicates a negative condition), as a condition that the output value o and the output value o' of the multiple target programs A and A' are inequivalent.

Instead, the constraint condition generating section 106 may acquire correspondence between the output values o and o' of the multiple target programs A and A' and generate a condition which becomes true when the output value o of the output variable O and the output value o' of the output variable O' for the multiple target programs A and A', respectively, are not corresponding values (for example, in the case where the output variable O and the output variable O' are different only in their names and are substantially the same, and the output value o and the output value o' are different from each other or in the case where the output variable O and the output variable O' are in a correspondence relationship with each other and the output value o and the output value o' are not corresponding values), as a condition that the output values o and o' for the multiple target programs A and A' are inequivalent.

The case where the output variable O and the output variable O' are not in a correspondence relationship with each other may be, for example, a case where a set of output variables O and a set of output variables O' are not in a correspondence relationship with each other. As an example, when output variable O={X} and output variable O'={Y,Z} are defined, and X=Y×10+Z (X is a two-digit integer, and Y and Z are one-digit integers) is satisfied, the constraint condition generating section 106 may generate not (X=Y×10+Z) as a condition that the output variable O and the output variable O' are inequivalent.

Next, the constraint condition generating section 106 generates a constraint condition C(I,O)^C'(I',O')^I=I'^ O=O' (the sign "^" indicates a logical product, that is, an AND condition) from a logical product of a condition that the input/output constraints C(I,O) and C'(I',O') as well as the input values i and i' of the target programs A and A' are equivalent, respectively, and a condition that the output values o and o' are inequivalent. Here, X=X' in the constraint condition indicates that X and X' are equivalent. The constraint condition generating section 106 provides the generated constraint condition to the constraint releasing section 108.

Next, at S106, the constraint releasing section 108 gives the constraint condition acquired from the constraint condition generating section 106 to the constraint solver to obtain input values i and i' satisfying the constraint condition. The constraint releasing section 108 may use, for example, a Satisfiability (SAT) solver, a Satisfiable Modulo Theories (SMT) solver or the like as the constraint solver.

For example, the constraint releasing section 108 acquires the constraint condition from the constraint condition generating section 106 and gives it to the constraint solver. The constraint releasing section 108 may execute the constraint solver to solve a logical expression included in the constraint condition and convert the acquired constraint condition to a constraint condition expressed only by the input variables I and I' and the output variables O and O'.

Here, for example, the constraint solver may convert the logical expression of the constraint condition to a product-sum type (an OR condition of an AND condition), that is, a disjunctive normal form (DNF) and, in order to cause any AND condition to be true, search for such an input value that each condition within the AND condition becomes true. The constraint solver may perform simplification of logic when converting the constraint condition to the product-sum type.

Furthermore, the constraint releasing section 108 acquires an input value i of the input variable I for the target program A and an input value i' of the input variable I' for the target program A' satisfying or having a possibility of satisfying the constraint condition by the constraint solver. For example, the constraint releasing section 108 may cause the constraint solver to execute a heuristic method for searching for a solution on the basis of a hypothesis, a backtrack method for, when an inconsistency occurs, returning solution search to a state before decision of a hypothesis or the like to acquire the input values i and i'.

The constraint releasing section 108 provides the acquired input values i and i' to the constraint condition generating section 106 and the execution section 110.

If the constraint releasing section 108 cannot acquire the input values i and i' in the process of S106, the information processing apparatus 10 may end the process. In this case, the notification section 114 notifies the user terminal 20 via the project managing section 116 that the input values i and i' have not been obtained.

Next, at S108, the execution section 110 reads out the target programs A and A' from the program database 2. The execution section 110 inputs the input value i acquired from the constraint releasing section 108 to the target program A and executes the target program A; and inputs the input value i' to the target program A' and executes the target program A'.

Thereby, the execution section 110 can verify whether or not the input values i and i' obtained by the constraint releasing section 108 actually output inequivalent output values. The execution section 110 provides the input values i and i', an output value o obtained by executing the target program A, and an output value o' obtained by executing the target program A' to the judgment section 112.

Next, at S110, the judgment section 112 judges whether or not equivalent output values o and o' have been obtained from the multiple target programs A and A'. For example, the judgment section 112 judges whether or not the output values o and o' are equal or whether or not the output value o and o' are corresponding values.

If judging that equivalent output values o and o' have not been obtained, the judgment section 112 advances the process to S114 and provides the judgment result and the input values i and i' to the notification section 114. If judging that equivalent output values o and o' have been obtained, the judgment section 112 advances the process to S118 and provides the judgment result and the input values i and i' to the constraint condition generating section 106.

At S114, the notification section 114 provides the input values i and i' to the project managing section 116. The project managing section 116 notifies the user of the input values i and i'. Here, the project managing section 116 may generate a task to request examination and/or modification of the target programs A and A' for which the input values i and i' have been notified and give the task to the project management program used by the user.

Next, at S116, the constraint condition generating section 106 judges whether or not to continue acquisition of input values i and i' satisfying the constraint condition by the constraint releasing section 108. For example, if the constraint releasing section 108 has acquired a predetermined number of input values i and i' satisfying the constraint condition, the constraint condition generating section 106 may judge that acquisition of the input values i and i' is not to be continued.

For example, if predetermined time has elapsed after start of the process, the constraint condition generating section 106 may judge that acquisition of the input values i and i' is not to be continued. For example, if acquiring an instruction to stop the process from the user via the user terminal 20 during the process, the constraint condition generating section 106 may judge that acquisition of the input values i and i' is not to be continued.

If judging that acquisition of the input values i and i' is not to be continued, the constraint condition generating section 106 ends the process. If judging that acquisition is to be continued, the constraint condition generating section 106 advances the process to S118. Instead, the constraint condition generating section 106 may skip the process of S116 and end the process.

At S118, the constraint condition generating section 106 updates the constraint condition. For example, the constraint condition generating section 106 adds a condition for excluding the input values i and i' obtained from the constraint releasing section 108 (for example, I!=i and I'!=i') to the constraint condition generated at the process of S104 to update the constraint condition (the sign "!=" indicates inequality or inequivalence). The information processing apparatus 10 returns the process to S106.

In the process of S106 at and after the second time, the constraint releasing section 108 gives the updated constraint condition to the constraint solver to obtain other input values i and i' satisfying the updated constraint condition.

As described above, according to the information processing method of the present embodiment, the information processing apparatus 10 acquires equivalent input values i and i' having a possibility of outputting inequivalent output values o and o' for target programs A and A' before and after refactoring, and executes the target programs A and A' with the input values i and i' to test whether the inequivalent output values o and o' are actually outputted. If the inequivalent output values o and o' are outputted, the notification section 114 notifies the user of the input values i and i' to call the user's attention.

Furthermore, according to the information processing method of the present embodiment, if it is judged that equivalent output values o and o' are obtained from the multiple target programs A and A', the constraint releasing section 108 re-executes the constraint solver and repeats the cycle of obtaining other input values i and i' satisfying the constraint condition.

Thereby, according to the information processing method of the present embodiment, it is possible to quickly and efficiently obtain equivalent input values i and i' which output inequivalent output values o and o' and notify the user of an input value having a possibility of making it impossible to keep consistency between execution results of a target program before and after refactoring to call the user's attention.

In the process of S102, the acquisition section 104 may acquire the input/output constraints C(I, O) and C'(I', O') corresponding to the target programs A and A' from the constraint database 4. In this case, the information processing apparatus 10 may skip the process of S100. Furthermore, the information processing apparatus 10 may skip the process of S108.

FIG. 3 shows an example of refactoring of a target program A in the present embodiment. For example, the user reads the program A shown in (a) from the program database 2 by the user terminal 20 and executes refactoring of the program A to generate a program A' shown in (b).

For example, the programs A and A' may be a program for inputting an integer ZIP corresponding to a postcode and an integer country corresponding to a country code to output an address corresponding to the postcode. The conditional expression on the second line of the program A executes the processing on the third line when a conditional expression zip<0 is true. The conditional expression on the fifth line of the program A executes the processing on the sixth line when the conditional expression zip<0 is true. After that, the program A executes processings on the eighth and ninth lines. The program A' does not include a conditional expression and sequentially executes processings on the third to sixth lines.

FIG. 4 shows an example of an input/output constraint for the target program A shown in FIG. 3, which are generated by the input/output constraint generating section 102. In the process of S100, first, the input/output constraint generating section 102 detects conditional branches such as an if-sentence from the target program A and identifies one or multiple execution paths in the target program A.

Next, for each execution path in the target program A, the input/output constraint generating section 102 generates a condition which becomes true when a conditional expression related to an input variable and/or an output variable for passing through the execution path becomes true and an expression to be assigned to an assignment statement related to an input variable and/or an output variable within the execution path corresponds to an assignment destination variable, as an input/output constraint for the execution path.

Here, the conditional expression related to an input variable and/or an output variable may be such a conditional expression that whether the conditional expression is true or false depends on the value(s) of the input variable and/or the output variable. The input/output constraint generating section 102 may not include conditions other than the conditional expression related to an input variable and/or an output variable in the input/output constraint.

The assignment statement related to an input variable and/or an output variable may be an assignment statement which includes an input variable, an output variable and/or a variable dependent on the values of the variables as variables within the assignment statement. The input/output constraint generating section 102 may not include conditions of assignment statements other than the assignment statement related to an input variable and/or an output variable in the input/output constraint.

Next, the input/output constraint generating section 102 generates a logical sum of input/output constraints for all the execution paths to generate an input/output constraint for the target program A.

For example, the target program A shown in FIG. 4(c) includes execution paths passing/not passing through a conditional branch if(zip<0) and execution paths passing/not passing through a conditional branch if(country<0), that is, a total of 2×2=4 execution paths exist.

In this case, as an input/output constraint for the program A shown in FIG. 4(d), the input/output constraint generating section 102 generates an input/output constraint constituted by a logical sum of:

an input/output constraint for an execution path (1) which passes through the conditional branch if(zip<0) and passes through the conditional branch if(country<0);

an input/output constraint for an execution path (2) which does not pass through the conditional branch if(zip<0) and does not pass through the conditional branch if(country<0);

an input/output constraint for an execution path (3) which passes through the conditional branch if(zip<0) and does not pass through the conditional branch if(country<0); and an input/output constraint for an execution path (4) which does not pass through the conditional branch if(zip<0) and passes through the conditional branch if(country<0).

For example, as the input/output constraint of (1), the input/output constraint generating section 102 generates an input/output constraint satisfying conditions (zip<0 and country<0) for a conditional expression for passing through the execution path (1) to be true, and assignment expression conditions (zip1=1, country1=0, and addr={zip=zip1, country=country1}) which become true when expressions assigned to assignment sentences (zip=1 and country=0) in the execution path (1) agree with assignment-destination variables. Here, the variables zip1 and country1 are variables after assignment distinguished from the variables zip and country before assignment.

Furthermore, for example, the input/output constraint generating section 102 generates an input/output constraint satisfying conditions (zip>=0 and country>=0) for a conditional expression for passing through the execution path (2) to be true, and assignment expression conditions (zip1=zip, country1=country, and addr={zip=zip1, country=country1}) which become true when expressions assigned to assignment sentences in the execution path (2) agree with assignment-destination variables, as the input/output constraint of (2). Since an assignment sentence related to the variable country does not exist in the execution path (2), the input/output constraint generating section 102 uses a condition in which the variable country is immediately assigned to the variable country1.

Furthermore, for example, the input/output constraint generating section 102 generates an input/output constraint satisfying conditions (zip<0 and country>=0) for a conditional expression for passing through the execution path (3) to be true, and assignment expression conditions (zip1=1, country1=country, and addr={zip=zip1, country=country1}) which become true when expressions assigned to assignment sentences in the execution path (3) agree with assignment-destination variables, as the input/output constraint of (3).

Furthermore, for example, the input/output constraint generating section 102 generates an input/output constraint satisfying conditions (zip>=0 and country<0) for a conditional expression for passing through the execution path (4) to be true, and assignment expression conditions (zip1=zip, country1=0, and addr={zip=zip1, country=country1}) which become true when expressions assigned to assignment sentences in the execution path (4) agree with assignment-destination variables, as the input/output constraint of (4).

As shown in FIG. 4(d), the input/output constraint generating section 102 generates the input/output constraint for the program A by combining the input/output constraints (1) to (4) generated for the execution paths, respectively, by a logical sum OR. Here, the input/output constraint generating section 102 may treat static local variables in subroutines in the target program as input/output variables or may ignore them.

FIG. 5 shows an example of an input/output constraint for the target program A' shown in FIG. 3, which are generated by the input/output constraint generating section 102. In the process of S100, first, the input/output constraint generating section 102 detects conditional branches such as an if-sentence from the target program A' shown in FIG. 5(d) and identifies execution paths in the target program A'. Since a conditional branch does not exist in the target program A', the input/output constraint generating section 102 identifies one execution path in the target program A'.

Next, the input/output constraint generating section 102 generates an assignment expression condition which becomes true when a conditional expression for passing through an execution pass becomes true and expressions assigned to assignment sentences in the execution path agree with assignment-destination variables as the input/output constraint.

For example, since a conditional expression for passing through one execution path of the target program A' shown in FIG. 5(e) is always true, the input/output constraint generating section 102 does not provide the conditional expression for passing through the execution path but generates an input/output constraint satisfying assignment expression conditions (zip1=max(zip',0), country1'=max(country',0), and addr'={zip=zip1', country=country1}) which become true when expressions assigned to assignment sentences (zip'=Math.max(zip',0), country=Math.max(country',0), and Address addr=new Address(zip',country')) in the execution path agree with assignment-destination variables, as an input/output constraint for the program A'.

Figure 6:
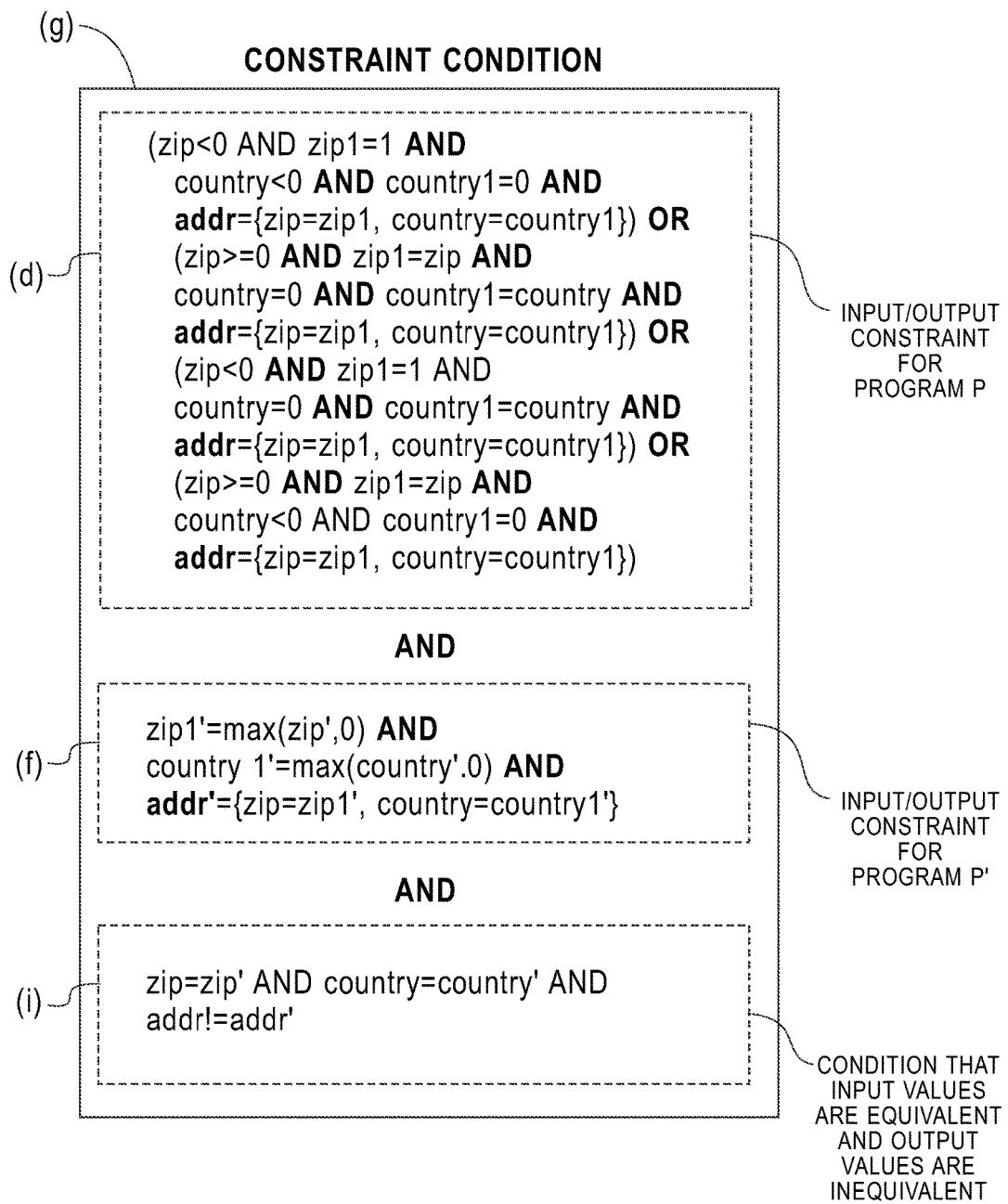
FIG. 6 shows an example of a constraint condition generated by a constraint condition generating section 106.

FIG. 6 shows an example of a constraint condition generated by the constraint condition generating section 106. In the process of S104, the constraint condition generating section 106 generates a condition (i) which becomes true when input values for the target programs A and A' are equivalent (zip=zip' and country=country') and output values for the multiple target programs are inequivalent (addr!=addr).

Next, the constraint condition generating section 106 combines an input/output condition (d) for the target program A, an input/output condition (f) for the target program A' and the condition (i) by a logical product to generate a constraint condition (g) satisfying these conditions.

By using the constraint condition generated in this way, the information processing apparatus 10 can quickly and efficiently acquire equivalent input values i and i' which output inequivalent output values o and o', respectively.

FIG. 7 shows an example of an input/output constraint for the target program X in a variation of the present embodiment. In the process of S100, if an expression to be assigned includes operation which cannot be handled by the constraint solver, in an assignment sentence in a target program, the input/output constraint generating section 102 may convert the expression to be assigned, to an expression which can be handled by the constraint solver.

For example, when an assignment expression condition includes operation which cannot be analyzed by static analysis, the input/output constraint generating section 102 may convert the assignment expression condition to a broader condition which can be handled by the constraint solver. As an example, the input/output constraint generating section 102 may convert an expression to be assigned, to a condition which becomes true when the expression to be assigned is true, and is also true even when the expression to be assigned is false.

As a more specific example, when square operation (Math.pow(zip,2)) which cannot be handled by the constraint solver is included in the target program X as shown in FIG. 7(k), the input/output constraint generating section 102 may convert the operation of Math.pow(zip,2) to a condition (for example, zip>0) which can be handled by the constraint solver and is broader than Math.pow(zip,2). Operations which cannot be handled by a constraint solver differ according to the constraint solver. For example, exponentiation, a trigonometric function, an index/logarithmic function, random numbers and the like are included.

Thereby, the range of input values i and i' satisfying the constraint condition is enlarged, the possibility for the information processing apparatus 10 to acquire the input values i and i' by the constraint releasing section 108 increases.

Instead, when an assignment expression condition includes operation which cannot be analyzed by static analysis, the input/output constraint generating section 102 may convert the assignment expression condition to a narrower condition which can be handled by the constraint solver. Thereby, the possibility for the information processing apparatus 10 to acquire such input values i and i' that output values o and o' are equivalent is decreased, and the accuracy of search can be improved.

Figure 8:
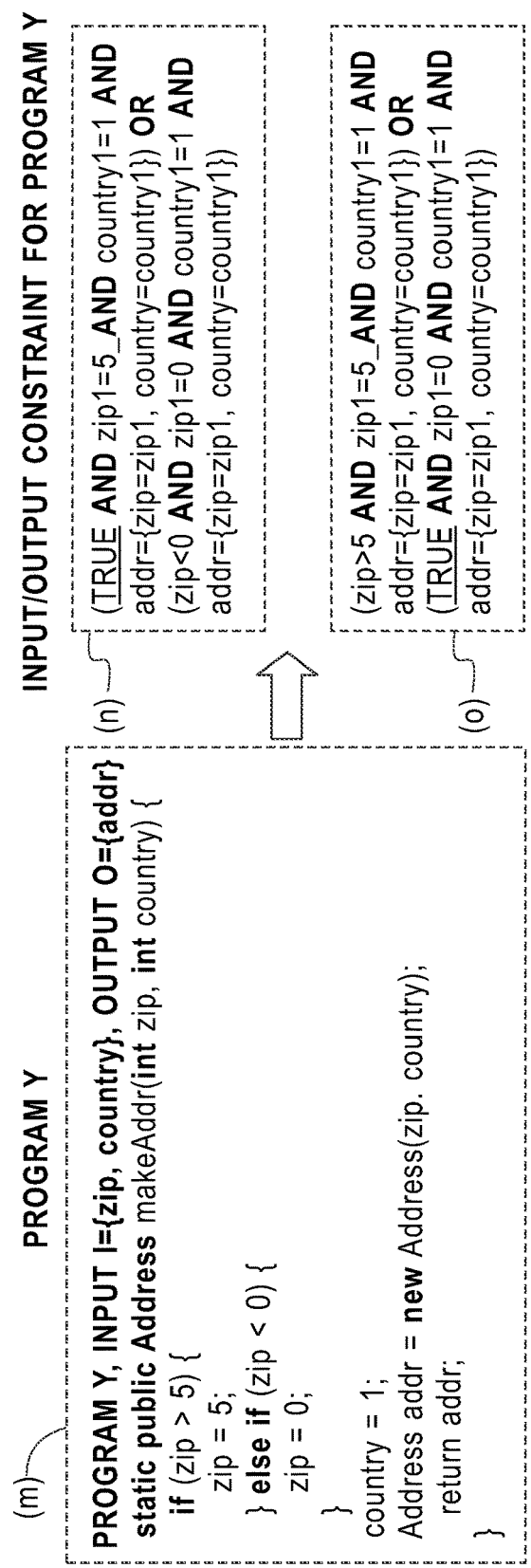
FIG. 8 shows an example of an input/output constraint for the target program Y in the variation of the present embodiment.

FIG. 8 shows an example of an input/output constraint for the target program Y in the variation of the present embodiment. In the present variation, the constraint releasing section 108 may search for input values i and i' for each execution path of a target program.

For example, in the present variation, the input/output constraint generating section 102 may generate multiple input/output constraints in which conditions for passing through execution paths different from one another, which are a part of multiple execution paths, are always true in one target program among multiple target programs, in the process of S100.

As an example, the input/output constraint generating section 102 may generate input/output constraints (TRUE AND zip1=5 AND country1=1 AND addr={zip=zip1, country=country1} in FIG. 8(n)) which cause conditions for passing through execution paths satisfying (zip>5), between the execution paths satisfying (zip>5) and execution paths satisfying a conditional branch (zip<0) in a program Y, to be always true, as shown in FIG. 8.

Here, the input/output constraint generating section 102 may cause conditions for passing through execution paths (in the example in FIG. 8, the execution paths satisfying the conditional branch (zip<0)) other than the execution paths which are to be always true, to be always false.

Furthermore, the input/output constraint generating section 102 may generate input/output constraints (TRUE AND zip1=0 AND country1=1 AND addr={zip=zip1, country=country1} in FIG. 8(o)) which cause the conditions for passing through the execution paths satisfying (zip<0) to be always true.

By causing conditions for passing through a part of multiple execution paths to be always true, the information processing apparatus 10 can reduce a processing load for solving a logical expression for a conditional branch corresponding to the execution paths which are to be true, and quickly obtain input value candidates corresponding to processing of the execution paths which are to be true.

Here, the input/output constraint generating section 102 may cause the conditions for passing through the execution paths (in the example in FIG. 8, execution paths satisfying the conditional branch (zip>5)) other than the execution paths which are to be always true, to be always false. Thereby, the information processing apparatus 10 can reduce a processing load of the execution paths which are to be false and quickly obtain input value candidates corresponding to processing of execution paths other than the execution paths which are to be false.

Next, the constraint condition generating section 106 may generate multiple constraint conditions corresponding to multiple input/output constraints (n) and (o) of the program Y. The constraint releasing section 108 may give the generated multiple constraint conditions to multiple constraint solvers, respectively, and acquire input values satisfying the multiple constraint conditions, respectively, from the multiple constraint solvers in parallel.

Thereby, the information processing apparatus 10 can acquire input values i and i' satisfying the constraint conditions for respective execution paths in parallel, and, therefore, it is possible to speed up the process.

Though description has been made on the assumption that the target programs A, A' and the like are programs before and after refactoring in the present embodiment, the target programs A, A' and the like are not limited thereto. For example, the target programs A and A' may be programs generated separately such that they are provided with the same or equal functions.

Figure 9:
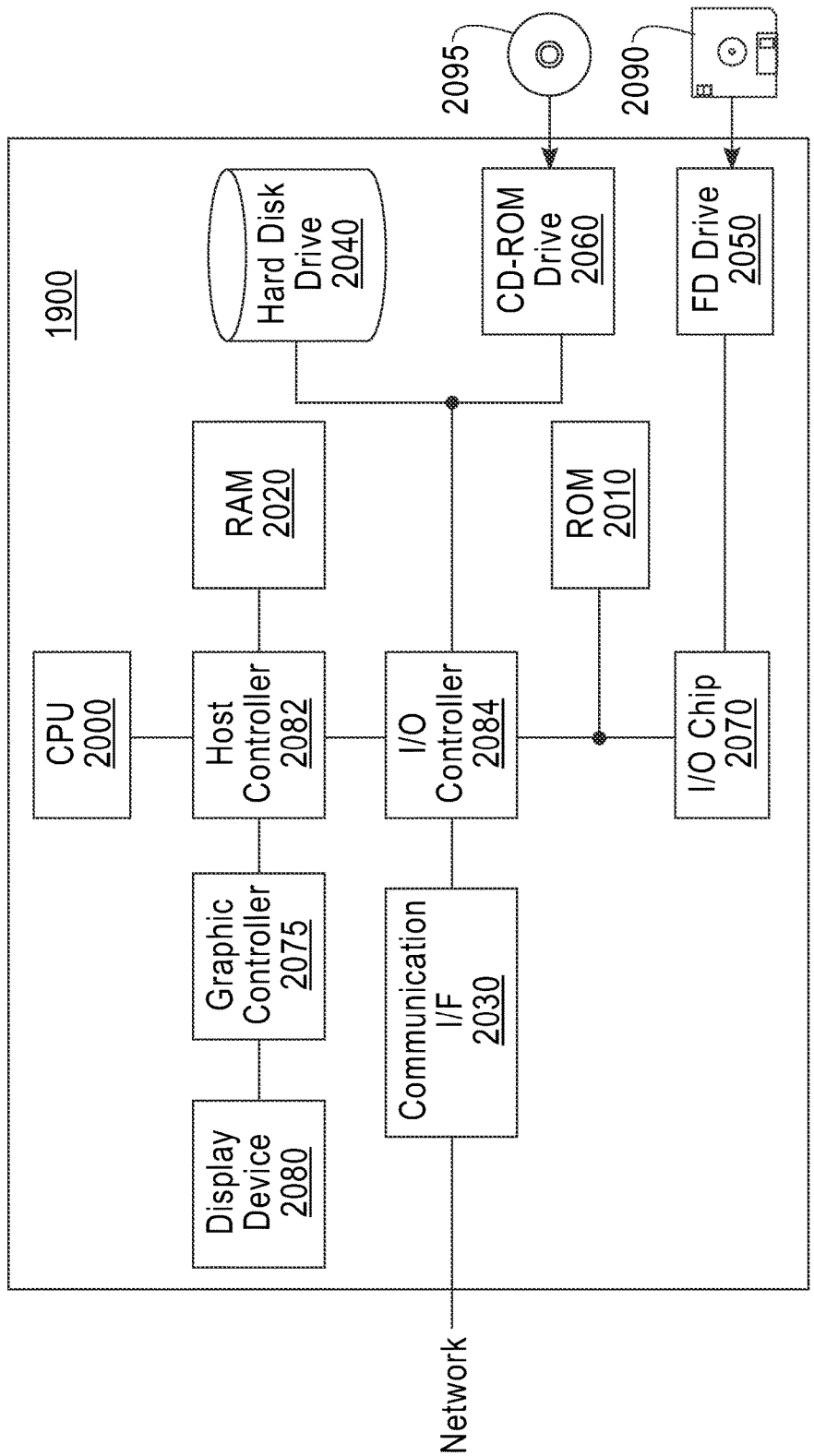
FIG. 9 shows an example of a hardware configuration of a computer 1900.

FIG. 9 shows an example of a hardware configuration of a computer 1900 which functions as the information processing apparatus 10. The computer 1900 according to the present embodiment is provided with: a CPU peripheral section having a CPU 2000, a RAM 2020, a graphic controller 2075 and a display device 2080 which are mutually connected via a host controller 2082; an input/output section having a communication interface 2030, a hard disk drive 2040 and a CD-ROM drive 2060 which are connected to the host controller 2082 via an input/output controller 2084; and a legacy input/output section having a ROM 2010, a flexible disk drive 2050 and an input/output chip 2070 which are connected to the input/output controller 2084.

The host controller 2082 connects the RAM 2020 to the CPU 2000 and the graphic controller 2075 which access the RAM 2020 at a high transfer rate. The CPU 2000 operates on the basis of programs stored in the ROM 2010 and the RAM 2020 to control each section.

The graphic controller 2075 acquires image data generated by the CPU 2000 and the like on a frame buffer provided in the RAM 2020 and displays the image data on the display device 2080. Instead, the graphic controller 2075 may internally include the frame buffer storing image data generated by the CPU 2000 and the like.

The input/output controller 2084 connects the host controller 2082 to the communication interface 2030, the hard disk drive 2040 and the CD-ROM drive 2060 which are relatively high-speed input/output devices. The communication interface 2030 wiredly or wirelessly communicates with other apparatuses via a network.

The communication interface also functions as hardware performing communication with the user terminal 20 and the like in the information processing apparatus 10. The hard disk drive 2040 stores programs and data used by the CPU 2000 in the computer 1900. The CD-ROM drive 2060 reads a program or data from a CD-ROM 2095 and provides it to the hard disk drive 2040 via the RAM 2020.

The ROM 2010 and, the flexible disk drive 2050 and the input/output chip 2070 which are relatively low-speed input/output devices are connected to the input/output controller 2084. The ROM 2010 stores a boot program executed when the computer 1900 is started up and/or programs and the like depending on the hardware of the computer 1900.

The flexible disk drive 2050 reads a program or data from a flexible disk 2090 and provides it to the hard disk drive 2040 via the RAM 2020. The input/output chip 2070 connects the flexible disk drive 2050 to the input/output controller 2084 as well as connecting various input/output devices to the input/output controller 2084, for example, via a parallel port, a serial port, a keyboard port, a mouse port or the like.

The program provided to the hard disk drive 2040 via the RAM 2020 is stored in a recording medium such as the flexible disk 2090, the CD-ROM 2095 and an IC card and provided by the user. The program is read out from the recording medium, installed into the hard disk drive 2040 in the computer 1900 via the RAM 2020 and executed by the CPU 2000.

The program which is installed in the computer 1900 and causes the computer 1900 to function as the information processing apparatus 10 is provided with an input/output constraint generating module, an acquisition module, a constraint condition generating module, a constraint releasing module, an execution module, a judgment module, a notification module and a project managing module.

These programs or modules may work on the CPU 2000 and the like to cause the computer 1900 to function as the input/output constraint generating section 102, the acquisition section 104, the constraint condition generating section 106, the constraint releasing section 108, the execution section 110, the judgment section 112, the notification section 114 and the project managing section 116.

By being read into the computer 1900, information processing described in these programs functions as the input/output constraint generating section 102, the acquisition section 104, the constraint condition generating section 106, the constraint releasing section 108, the execution section 110, the judgment section 112, the notification section 114 and the project managing section 116 which are specific means in which software and the various hardware resources described above work in cooperation.

Then, by realizing operation or processing of information according to the purpose of using the computer 1900 in the present embodiment by the specific means, a peculiar information processing apparatus 10 according to the use purpose is constructed.

As an example, in the case of performing communication between the computer 1900 and an external apparatus or the like, the CPU 2000 executes a communication program loaded on the RAM 2020 and instructs the communication interface 2030 to perform communication processing on the basis of the content of processing described in the communication program.

Under the control of the CPU 2000, the communication interface 2030 reads out send data stored in a transmission buffer area or the like provided on a recording device such as the RAM 2020, the hard disk drive 2040, the flexible disk 2090 and the CD-ROM 2095 and transmits the send data to a network; or the communication interface 2030 writes receive data received from the network into a receiving buffer area or the like provided on the storage device.

As described above, the communication interface 2030 may transfer send/receive data to/from a storage device by a DMA (direct memory access) system. Instead, transmit/receive data may be transferred by the CPU 2000 reading out data from a storage device or the communication interface 2030, which is a transfer source, and writing the data into the communication interface 2030 or a storage device, which is a transfer destination.

The CPU 2000 causes all or a necessary part of a file, a database or the like stored in an external storage device, such as the hard disk drive 2040, the CD-ROM drive 2060 (the CD-ROM 2095) and the flexible disk drive 2050 (the flexible disk 2090), to be read into the RAM 2020 by DMA transfer or the like and performs various processings for the data on the RAM 2020.

Then, the CPU 2000 writes the processed data back to the external storage device by DMA transfer or the like. The RAM 2020 can be regarded as what temporarily holds the contents of the external storage device in such a process. Therefore, in the present embodiment, the RAM 2020, the external storage device and the like are generically referred to as a memory, a storage section, a storage device or the like.

Various programs and various information such as data, tables and databases in the present embodiment are stored in such a storage device and targeted by information processing. The CPU 2000 can hold a part of the RAM 2020 in a cache memory and perform reading and writing on the cache memory.

In such a form also, the cache memory is responsible for a part of the functions of the RAM 2020. Therefore, in the present embodiment, it is assumed that the cache memory is also included in the RAM 2020, the memory and/or the storage device unless shown being distinguished.

The CPU 2000 performs various processings including various operations, information processing, condition judgment, information search/substitution and the like described in the present embodiment, which are specified by a sequence of instructions of the program, for data read out from the RAM 2020, and writes the data back to the RAM 2020.

For example, in the case of performing condition judgment, the CPU 2000 judges whether various variables shown in the present embodiment satisfy a condition of being larger, smaller, equal to or larger, equal to or smaller, equal, or the like in comparison with other variables or constants, and, when the condition is satisfied (or the condition is not satisfied) branches to a different sequence of instructions or calls a subroutine.

The CPU 2000 can also search for information stored in a file or a database in the storage device. For example, when multiple entries in which attribute values of a second attribute are associated with attribute values of a first attribute, respectively, are stored in the storage device, the CPU 2000 can obtain an attribute value of the second attribute associated with the first attribute satisfying a predetermined condition by searching for such an entry that the attribute value of the first attribute corresponds to the specified condition from among the multiple entries stored in the storage device and reading out the attribute value of the second attribute stored in the entry.

The programs or modules shown above may be stored in an external storage medium. As the recording medium, an optical recording medium such as a DVD and a CD, a magneto-optical recording medium such as an MO, a tape medium, a semiconductor memory such as an IC card or the like can be used in addition to the flexible disk 2090 and the CD-ROM 2095. A storage device such as a hard disk and a RAM provided for a server system connected to a dedicated communication network or the Internet may be used as the recording medium to provide the programs to the computer 1900 via the network.

The present invention has been described above with the use of an embodiment. The technical scope of the present invention is not limited to the scope described in the above embodiment. It is apparent to one skilled in the art that various changes or improvements can be made in the above embodiment. It is apparent from the description of Scope of Claims that forms in which such changes or improvements are made can be also included in the technical scope of the present invention.

It should be noted that the order of execution of processes such as operations, procedures, steps and stages in the apparatus, system, program and method shown in Scope of Claims, the specification and the drawings can be realized in an arbitrary order unless the order is especially explicitly shown with expressions such as "before . . . " and "prior to . . . ", and an output of the previous processing is used in the following processing. Even if an operational flow in Scope of Claims, the specification and the drawings is described with the use of expressions "first", "next" or the like for convenience, it does not mean that the flow is necessarily to be implemented in that order.

What is claimed is:

1. An information processing apparatus configured to:
retrieve two or more programs from a program database, the two or more programs comprising at least a target program and a refactored program, the refactored program being generated from the target program by changing a source code of the target program without changing a function of the target program;
generate a first constraint on both a first input of the target program and a first output of the target program, the first constraint indicating a first condition for using the first input to traverse a first execution path in the target program to generate the first output, wherein generating the first constraint comprises:
generating, for each execution path of the target program, a logical product of a condition for passing through an execution path of the target program, and generating a logical sum of the generated logical product for each execution path of the target program;
generate a second constraint on both a second input of the refactored program and a second output of the refactored program, the second constraint indicating a second condition for using the second input to traverse a second execution path in the refactored program to generate the second output, wherein generating the second constraint comprises:

generating, for each execution path of the refactored program, a logical product of a condition for passing through an execution path of the refactored program, and generating a logical sum of the generated logical product for each execution path of the refactored program;

generate a first constraint condition that evaluates to true when:

the first constraint is satisfied for a first input value of the first input and a first output value of the first output and the second constraint is satisfied for a second input value of the second input and a second output value of the second output, the first input value is equivalent to the second input value, and the first output value is not equivalent to the second output value;

execute a constraint solver using the first constraint condition to obtain the first input value for the target program and the second input value for the refactored program, wherein the first input value is equivalent to the second input value;

execute the target program using the first input value to generate the first output value and execute the refactored program using the second input value to generate the second output value;

determine whether the first output value is not equivalent to the second output value;

in response to determining that the first output value is not equivalent to the second output value, generate a task to request user examination and modification of the target program and the refactored program;

output a notification providing the first input value and the second input value, the notification including the task to request user examination and modification of the target program and the refactored program; and update the first constraint condition by adding a condition to exclude the first input value and the second input value.

2. The information processing apparatus according to claim 1, wherein providing the first input value and the second input value further comprises providing the first input value and the second input value to a user terminal, wherein the user terminal displays the first input value and the second input value to a user.

3. The information processing apparatus according to claim 1, wherein the target program and the refactored program each include multiple different execution paths having respective conditions for passing through the respective execution paths;

wherein the information processing apparatus is further configured to generate the first constraint and generate the second constraint such that at least one of the first condition and the second condition is evaluated to be always true.

4. The information processing apparatus according to claim 1, further configured to generate a second constraint condition that evaluates to true when the first input value is equal to the second input value, as a condition that the first input value is equivalent to the second input value.

5. The information processing apparatus according to claim 1, further configured to:

acquire correspondence among the first input value and the second input value; and generate a second constraint condition that evaluates to true when the first input value and the second input value are corresponding values, as a condition that the first input value is equivalent to the second input value.

6. The information processing apparatus according to claim 1, further configured to generate a second constraint condition that evaluates to true when the first output value does not agree with the second output value, as a condition that the first output value is not equivalent to the second output value.

7. The information processing apparatus according to claim 1, further configured to:

acquire correspondence among the first output value and the second output value; and generate a second constraint condition that evaluates to true when the first output value and the second output value are not corresponding values, as a condition that the first output value is not equivalent to the second output value.

8. The information processing apparatus according to claim 1, wherein the target program and the refactored program each include multiple different execution paths having respective conditions for passing through the respective execution paths;

wherein the information processing apparatus is further configured to generate the first constraint and generate the second constraint such that at least one of the first condition and the second condition is evaluated to be always false.

9. An information processing method executed by an information processing apparatus searching for equivalent input values that result in not equivalent output values among two or more programs, the method comprising:

retrieving the two or more programs, the two or more programs comprising at least a target program and a refactored program, the refactored program being generated from the target program by changing a source code of the target program without changing a function of the target program;

generating a first constraint on both a first input of the target program and a first output of the target program, the first constraint indicating a first condition for using the first input to traverse a first execution path in the target program to generate the first output, wherein generating the first constraint comprises:

generating, for each execution path of the target program, a logical product of a condition for passing through an execution path of the target program, and generating a logical sum of the generated logical product for each execution path of the target program;

generating a second constraint on both a second input of the refactored program and a second output of the refactored program, the second constraint indicating a second condition for using the second input to traverse a second execution path in the refactored program to generate the second output, wherein generating the second constraint comprises:

generating, for each execution path of the refactored program, a logical product of a condition for passing through an execution path of the refactored program, and generating a logical sum of the generated logical product for each execution path of the refactored program;

generating a first constraint condition that evaluates to true when:

the first constraint is satisfied for a first input value of the first input and a first output value of the first output and the second constraint is satisfied for a second input value of the second input and a second output value of the second output,
the first input value is equivalent to the second input value, and
the first output value is not equivalent to the second output value;
executing a constraint solver using the first constraint condition to obtain the first input value for the target program and the second input value for the refactored program, wherein the first input value is equivalent to the second input value;
executing the target program using the first input value to generate the first output value and executing the refactored target program using the second input value to generate the second output value;
determining whether the first output value is not equivalent to the second output value;
in response to determining that the first output value is not equivalent to the second output value, generating a task to request user examination and modification of the target program and the refactored program;
outputting a notification providing the first input value and the second input value, the notification including the task to request user examination and modification of the target program and the refactored program; and
updating the first constraint condition by adding a condition to exclude the first input value and the second input value.

10. The method of claim 9, wherein the target program and the refactored program each include multiple different execution paths having respective conditions for passing through the respective execution paths;
wherein generating the first constraint and generating the second constraint comprise generating the constraint and generating the second constraint such that at least one of the first condition and the second condition is evaluated to be always true.

11. The method of claim 9, wherein the target program and the refactored program each include multiple different execution paths having respective conditions for passing through the respective execution paths;
wherein generating the first constraint and generating the second constraint comprise generating the first constraint and generating the second constraint such that at least one of the first condition and the second condition is evaluated to be always false.

12. A program product comprising a non-transitory processor-readable storage medium having program instructions embodied thereon, the program instructions executable by a processor to cause the processor to:
retrieve two or more programs, the two or more programs comprising at least a target program and a refactored program, the refactored program being generated from the target program by changing a source code of the target program without changing a function of the target program;
generate a first constraint on both a first input of the target program and a first output of the target program, the first constraint indicating a first condition for using the first input to traverse a first execution path in the target program to generate the first output, wherein generating the first constraint comprises:
generating, for each execution path of the target program, a logical product of a condition for passing through an execution path of the target program, and
generating an logical sum of the generated logical product for each execution path of the target program;
generate a second constraint on both a second input of the refactored program and a second output of the refactored program, the second constraint indicating a second condition for using the second input to traverse a second execution path in the refactored program to generate the second output, wherein generating the second constraint comprises:
generating, for each execution path of the refactored program, a logical product of a condition for passing through an execution path of the refactored program, and
generating a logical sum of the generated logical product for each execution path of the refactored program;
generate a first constraint condition that evaluates to true when:
the first constraint is satisfied for a first input value of the first input and a first output value of the first output and the second constraint is satisfied for a second input value of the second input and a second output value of the second output,
the first input value is equivalent to the second input value, and
the first output value is not equivalent to the second output value;
execute a constraint solver using the first constraint condition to obtain the first input value for the target program and the second input value for the refactored program, wherein the first input value is equivalent to the second input value;
execute the target program using the first input value to generate the first output value and executing the refactored target program using the second input value to generate the second output value;
determine whether the first output value is not equivalent to the second output value;
in response to determining that the first output value is not equivalent to the second output value, generate a task to request user examination and modification of the target program and the refactored program;
output a notification providing the first input value and the second input value, the notification including the task to request user examination and modification of the target program and the refactored program; and
update the first constraint condition by adding a condition to exclude the first input value and the second input value.

13. The program product of claim 12, wherein the target program and the refactored program each include multiple different execution paths having respective conditions for passing through the respective execution paths;
wherein the program instructions are further configured to cause the processor to generate the first constraint and generate the second constraint such that at least one of the first condition and the second condition is evaluated to be always true.

14. The program product of claim 12, wherein the target program and the refactored program each include multiple different execution paths having respective conditions for passing through the respective execution paths;
wherein the program instructions are further configured to cause the processor to generate the first constraint and generate the second constraint such that at least one of the first condition and the second condition is evaluated to be always false.

* * * * *